(12) United States Patent
Wachi et al.

(10) Patent No.: US 12,346,802 B2
(45) Date of Patent: Jul. 1, 2025

(54) NEURO-SYMBOLIC NEXT STATE PREDICTION BASED ON MULTIPLE POTENTIAL CAUSES

(71) Applicant: International Business Machines Corporation, Armonk, NY (US)

(72) Inventors: Akifumi Wachi, Tokyo (JP); Ryosuke Kohita, Tokyo (JP); Daiki Kimura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 17/110,400

(22) Filed: Dec. 3, 2020

(65) Prior Publication Data

US 2022/0180166 A1 Jun. 9, 2022

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ........ G06N 3/0454; G06N 3/04; G06N 3/042; G06N 5/027; G06N 3/08
See application file for complete search history.

(56) References Cited

U.S. PATENT DOCUMENTS

| 11,694,061 B2 * | 7/2023 | Byrnes | G06N 3/042 706/15 |
| 2016/0234972 A1 * | 8/2016 | Billet | H05K 7/20836 |
| 2017/0235735 A1 * | 8/2017 | Ignatyev | G06Q 10/00 706/12 |
| 2019/0244112 A1 * | 8/2019 | Bowling | G06N 3/044 |
| 2019/0251449 A1 * | 8/2019 | Dai | G06N 3/044 |
| 2019/0272465 A1 | 9/2019 | Kimura | |
| 2019/0385061 A1 | 12/2019 | Chaudhury | |

OTHER PUBLICATIONS

"Multi-Label Image Classification with Neural Network," Towards Data Science, Verma, pp. 1-2 (Year: 2019).*
"Joint Event Extraction Based on Hierarchical Event Schemas From FrameNet," IEEE, Li et al; Li (Year: 2019).*
"Neural-Symbolic Learning Systems: Foundations and Applications," Springer-Verlag Landan Ltd, d'Avila Garcez et al; d'Avila Garcez (Year: 2002).*

(Continued)

*Primary Examiner* — Michael J Huntley
*Assistant Examiner* — Paul J Breene
(74) *Attorney, Agent, or Firm* — Yee & Associates, P.C.

(57) ABSTRACT

Next state prediction technology that performs the following computer based operations: receiving state information that includes information indicative of a current state of an environment; processing the state information to predict a future state of the environment, with the processing being performed by a hybrid computer system that includes both of the following: (i) neural network software module(s) that include machine learning functionality, and (ii) symbolic rule based software modules; and using the prediction of the next state of the environment as an input with respect to taking a further action (for example, activating a hardware device or effecting a communication to a human or another device).

9 Claims, 6 Drawing Sheets

(56) References Cited

OTHER PUBLICATIONS

"Generating Sequences With Recurrent Neural Networks," arXiv, Graves (Year: 2014).*

"Neural-Symvolic Learning Systems: Foudnations and Applications," Springer-Verlag Landan Ltd, d'Avila Garcez et al; d'Avila Garcez (Year: 2002).*

Angeli et al., "Leveraging Linguistic Structure for Open Domain Information Extraction", Proceedings of the 53rd Annual Meeting of the Association for Computational Linguistics and the 7th International Joint Conference on Natural Language Processing, pp. 344-354, Beijing, China, Jul. 26-31, 2015, 11 pages.

Cote et al., "TextWorld: A Learning Environment for Text-based Games", arXiv:1806.11532v2 [cs.LG] Nov. 8, 2019, 29 pages.

Coumans et al., "Pybullet Quickstart Guide", 2016-2019, 87 pages, <http://pybullet.org>.

Devlin et al., "BERT: Pre-training of Deep Bidirectional Transformers for Language Understanding", arXiv:1810.04805v2 [cs.CL] May 24, 2019, 16 pages.

Gammulle et al., "Predicting the Future: A Jointly Learnt Model for Action Anticipation", 2019 IEEE/CVF International Conference on Computer Vision (ICCV), Oct. 27-Nov. 2, 2019, DOI: 10.1109/ICCV.2019.00566, Seoul, Korea (South), Korea (South), 10 pages.

Granroth-Wilding et al., "What Happens Next? Event Prediction Using a Compositional Neural Network Model", Copyright © 2015, Association for the Advancement of Artificial Intelligence (www.aaai.org), 7 pages.

Hassanzadeh et al., "Answering Binary Causal Questions Through Large-Scale Text Mining: An Evaluation Using Cause-Effect Pairs from Human Experts", Proceedings of the Twenty-Eighth International Joint Conference on Artificial Intelligence (IJCAI-19), 7 pages.

He et al., "Mask R-CNN", 2017 IEEE International Conference on Computer Vision (ICCV), Oct. 22-29, 2017, DOI: 10.1109/ICCV.2017.322, Added to IEEE Xplore: Dec. 25, 2017, Conference Location: Venice, Italy, 9 pages.

Iten et al., "Discovering physical concepts with neural networks," arXiv:1807.10300v3 [quant-ph] Jan. 23, 2020, 18 pages.

Johnson, et al., "CLEVR: A Diagnostic Dataset for Compositional Language and Elementary Visual Reasoning", 2017 IEEE Conference on Computer Vision and Pattern Recognition (CVPR), Jul. 21-26, 2017, Added to IEEE Xplore: Nov. 9, 2017, DOI: 10.1109/CVPR.2017.215, Conference Location: Honolulu, HI, USA, 10 pages.

Kitaev et al., "Constituency Parsing with a Self-Attentive Encoder", arXiv:1805.01052v1 [cs.CL] May 2, 2018, 12 pages.

Mao et al., "The Neuro-Symbolic Concept Learner: Interpreting Scenes, Words, and Sentences From Natural Supervision", Published as a conference paper at ICLR 2019, arXiv:1904.12584v1 [cs.CV] Apr. 26, 2019, 28 pages.

Petruck, Miriam R. L., "Background to FrameNet", International Computer Science Institute, LREC 2016, May 24, 2016, 67 pages.

Polceanu, Mihai, "ORPHEUS: Reasoning and Prediction with Heterogeneous rEpresentations Using Simulation", Artificial Intelligence [cs.AI], Universite de Bretagne Occidentale (UBO), 2015. English, 128 pages.

Radinsky et al., "Learning to Predict from Textual Data", Journal of Artificial Intelligence Research 45 (2012) 641-684, Submitted Nov. 2012; published Dec. 2012.

Rajani et al., "Explain Yourself! Leveraging Language Models for Commonsense Reasoning", arXiv:1906.02361v1 [cs.CL] Jun. 6, 2019, 11 pages.

Ruppenhofer et al., "FrameNet II: Extended Theory and Practice", Printed Sep. 14, 2010, 119 pages.

Schneider, et al., "The NLTK FrameNet API: Designing for Discoverability with a Rich Linguistic Resource", Proceedings of the 2017 EMNLP System Demonstrations, pp. 1-6, Copenhagen, Denmark, Sep. 7-11, 2017, © 2017 Association for Computational Linguistics.

Talmor et al., "CommonSenseQA: A Question Answering Challenge Targeting Commonsense Knowledge", arXiv:1811.00937v2 [cs.CL] Mar. 15, 2019, 10 pages.

Yi et al., "CLEVRER: Collision Events for Video Representation and Reasoning", Published as a conference paper at ICLR 2020, arXiv:1910.01442v2 [cs.CV] Mar. 8, 2020, 19 pages.

Yi et al., "Neural-Symbolic VQA: Disentangling Reasoning from Vision and Language Understanding", 32nd Conference on Neural Information Processing Systems (NeurIPS 2018), Montréal, Canada, 12 pages.

Zolfaghari et al., "Learning Representations for Predicting Future Activities", arXiv:1905.03578v1 [cs.CV] May 9, 2019, 14 pages.

* cited by examiner

400

---

SCREEN SHOT DISPLAY GENERATED BY A COMPUTER

TO: LOCAL FIRE DEPARTMENT

FROM: 123 MAIN STREET FACILITIES DEPARTMENT

Our hybrid computing system, including machine learning components and symbolic logic components has detected smoldering and/or conditions that may lead to smoldering. You may want to consider investigating this with an eye forward preventing a potential fire.

NEURO-SYMBOLIC NEXT STATE PREDICTION BASED ON MULTIPLE POTENTIAL CAUSES

BACKGROUND

The present invention relates generally to the field of machine logic for performing next state prediction, and also to the field of neuro-symbology. In a "neuro-symbolic" computer system some of the components are rule-based (that is, based on a set of symbolic rules) and others are neural-network based.

Software is used to perform various existing forms of "next state prediction." That is, the software (for example, artificial intelligence software) predicts the next status of the system, environment, or human without actually taking an action for the current state. For purposes of this document, "next state" is the state description at the next time step. For a concrete example of next state prediction, consider the following: (i) state at time t is "door: open"; (ii) action at time t is "close the door"; and (iii) next state prediction is used to predict the status of the door at time t+1 (which presumably would be the closed state, pursuant to the action that occurred at time t).

Next state prediction has been applied in the field of reinforcement learning, as can be seen from the Wikipedia entry for "reinforcement learning" (as of 16 Aug. 2020) which states, in part, as follows: "Reinforcement learning (RL) is an area of machine learning concerned with how software agents ought to take actions in an environment in order to maximize the notion of cumulative reward. Reinforcement learning is one of three basic machine learning paradigms, alongside supervised learning and unsupervised learning. . . . The environment is typically stated in the form of a Markov decision process (MDP), because many reinforcement learning algorithms for this context utilize dynamic programming techniques. . . . The typical framing of a Reinforcement Learning (RL) scenario: an agent takes actions in an environment, which is interpreted into a reward and a representation of the state, which are fed back into the agent . . . . Basic reinforcement is modeled as a Markov decision process: a set of environment and agent states, S; a set of actions, A, of the agent; . . . Rules are often stochastic. The observation typically involves the scalar, immediate reward associated with the last transition. In many works, the agent is assumed to observe the current environmental state (full observability). If not, the agent has partial observability. Sometimes the set of actions available to the agent is restricted (a zero balance cannot be reduced. For example, if the current value of the agent is 3 and the state transition reduces the value by 4, the transition will not be allowed)." (footnotes omitted)

The Wikipedia entry for "symbolic artificial intelligence" (as of 12 Aug. 2020) states, in part, as follows: "Symbolic artificial intelligence is the term for the collection of all methods in artificial intelligence research that are based on high-level 'symbolic' (human-readable) representations of problems, logic and search. Symbolic AI was the dominant paradigm of AI research from the mid-1950s until the late 1980s. . . . The approach is based on the assumption that many aspects of intelligence can be achieved by the manipulation of symbols, an assumption defined as the 'physical symbol systems hypothesis' . . . One popular form of symbolic AI is expert systems, which uses a network of production rules. Production rules connect symbols in a relationship similar to an If-Then statement. The expert system processes the rules to make deductions and to determine what additional information it needs, i.e. what questions to ask, using human-readable symbols. Symbolic AI was intended to produce general, human-like intelligence in a machine, whereas most modern research is directed at specific sub-problems. Research into general intelligence is now studied in the sub-field of artificial general intelligence. Machines were initially designed to formulate outputs based on the inputs that were represented by symbols. Symbols are used when the input is definite and falls under certainty. But when there is uncertainty involved, for example in formulating predictions, the representation is done using artificial neural networks. Recently, there have been structured efforts towards integrating the symbolic and connectionist AI approaches under the umbrella of neural-symbolic computing." (footnotes omitted)

The difference between symbolic logic components and neural network components will now be discussed. As a threshold matter, it is noted that "components" here means pieces of software that are in some sense discrete pieces of software, and these components may sometimes be herein referred to as "modules" (see definition of "modules," below, in the Definitions sub-section of the Detailed Description section). Artificial intelligence (AI) style computing distinguishes between rule-based techniques and neural network implemented techniques (sometimes herein referred to as "machine learning techniques"). AI is split into these two groups. Achieving AI through a rule-based technique is referred to as a rule-based system. Achieving AI through a machine learning technique is called a learning system. So, in summary: (i) rule-based components are pieces of software that do not include any machine learning (ML); and (ii) (neural network based components are pieces of software that do include at least some ML.

The Wikipedia entry for "softmax function" (as of 20 Oct. 2020) states, in part, as follows: "The softmax function, also known as softargmax . . . or normalized exponential function, . . . is a generalization of the logistic function to multiple dimensions. It is used in multinomial logistic regression and is often used as the last activation function of a neural network to normalize the output of a network to a probability distribution over predicted output classes. The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0, 1) {\displaystyle (0,1)} (0,1), and the components will add up to 1, so that they can be interpreted as probabilities. Furthermore, the larger input components will correspond to larger probabilities. The standard (unit) softmax function [given by a notation set forth in the Wikipedia here being quoted] is defined by [a] formula [set forth in the Wikipedia entry here being quoted]." (footnotes omitted)

SUMMARY

According to an aspect of the present invention, there is a method, computer program product and/or system that performs the following operations (not necessarily in the following order): (i) receiving state information that includes information indicative of a current state of an environment; (ii) processing the state information to predict a future state of the environment, with the processing being performed by a hybrid computer system that includes both of the following: (a) neural network software module(s) that include machine learning functionality, and (b) symbolic rule based software modules; and (iii) using the prediction of the next state of the environment as an input with respect to taking a further action.

BRIEF DESCRIPTION OF THE DRAWINGS

FIG. 4 is a screenshot view generated by the first embodiment system;

DETAILED DESCRIPTION

Figure 1:
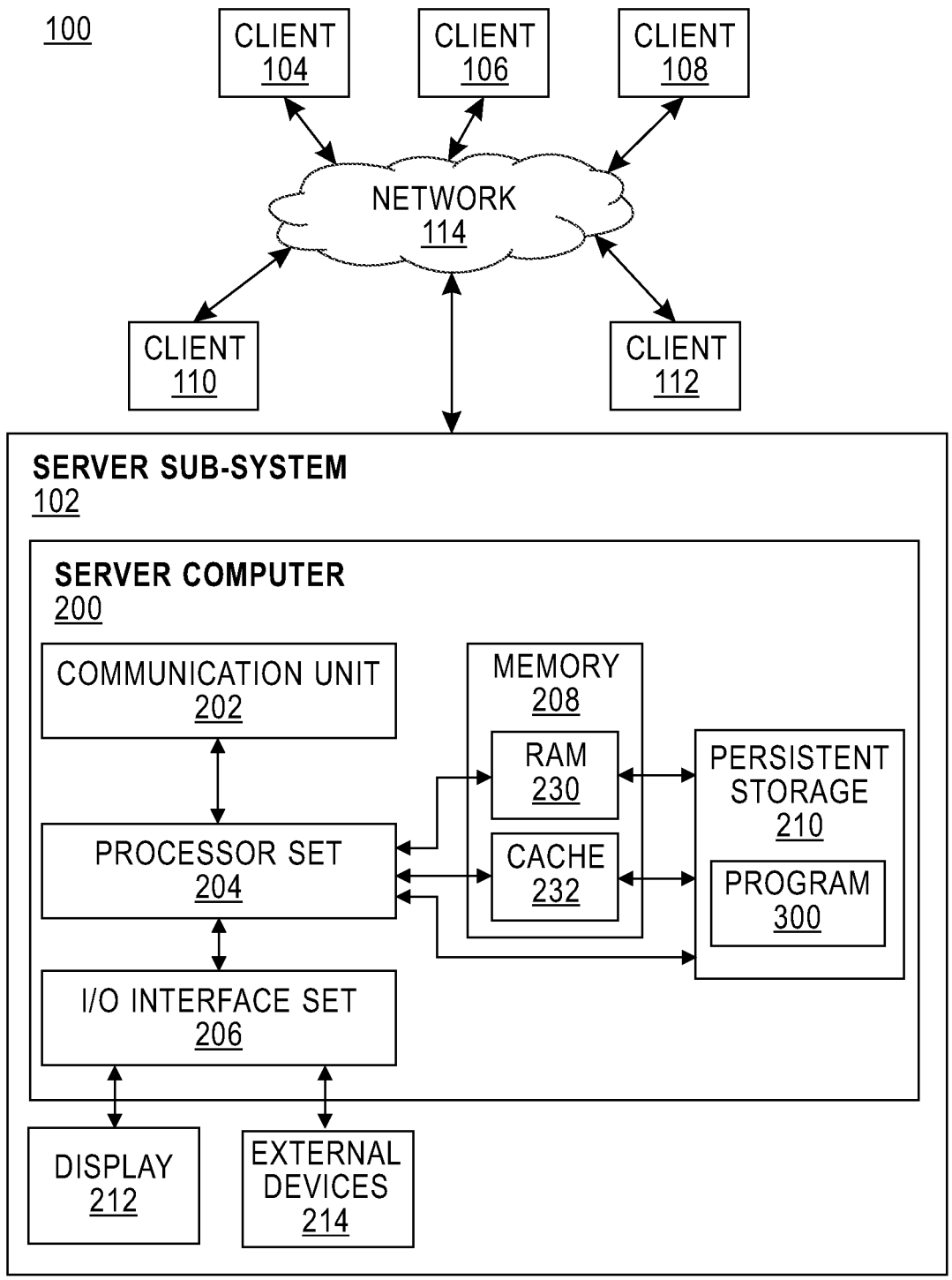
FIG. 1 is a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
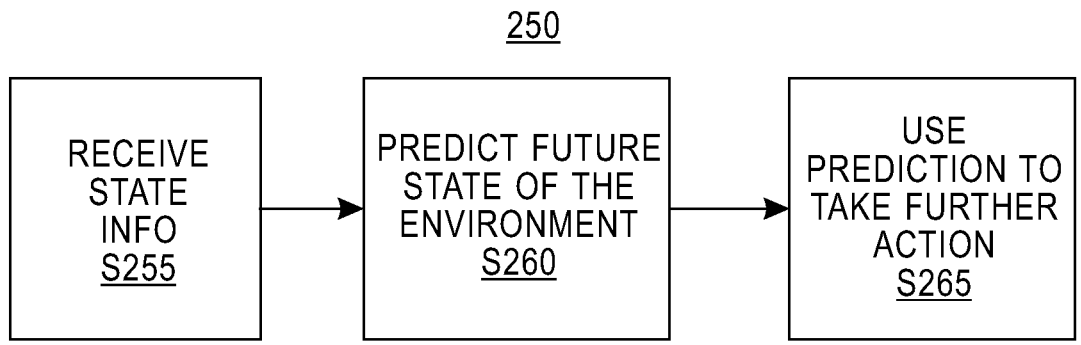
FIG. 2 is a flowchart showing a first embodiment method performed, at least in part, by the first embodiment system.
Figure 3:
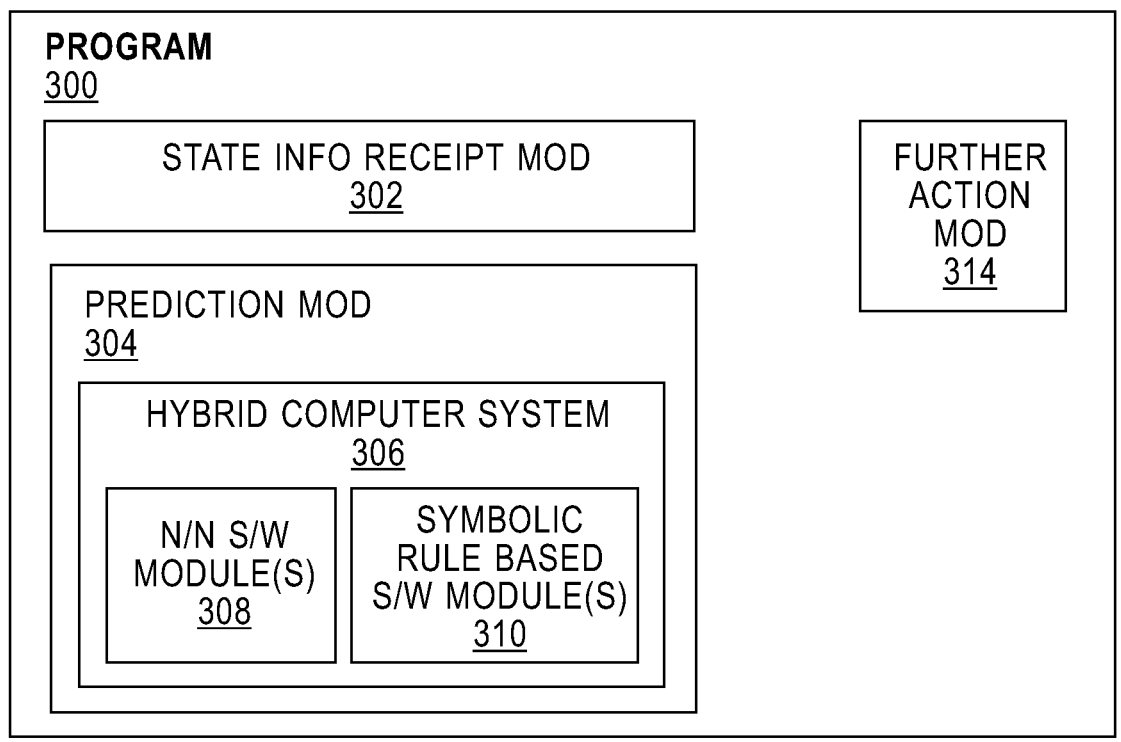
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where module ("mod") 302 state info receipt mod receives state information. In this example, the state information includes information indicative of a current state of an environment, as well as some historical states of the environment as it existed in the past. In this example, the state information is collected, formatted and sent to mod 302 by client sub-system 104 through communication network 114.

Processing proceeds to operation S260 where prediction mod 304 processes the state information to predict a future state of the environment. More specifically, the processing being performed by a hybrid computer system 306 that includes both of the following: (i) neural network software module(s) 308 that includes machine learning functionality, and (ii) symbolic rule based software modules 310.

Processing proceeds to operation S265 where further action mod 314 uses the prediction of the next state of the environment as an input with respect to taking a further action. In this example, the prediction of the next state is a prediction that a building being monitored by the Internet of Things (not separately shown in the Figures) will burn down unless: (i) the building's sprinkler system is turned on, and (ii) the fire department is notified of the situation. Accordingly, in this example, the further actions performed by mod 314 are as follows: (i) turn on building's sprinkler system using IoT technology, and (ii) notify the fire department by email (see screen shot 400 of FIG. 4).

III. Further Comments and/or Embodiments

Figure 5:
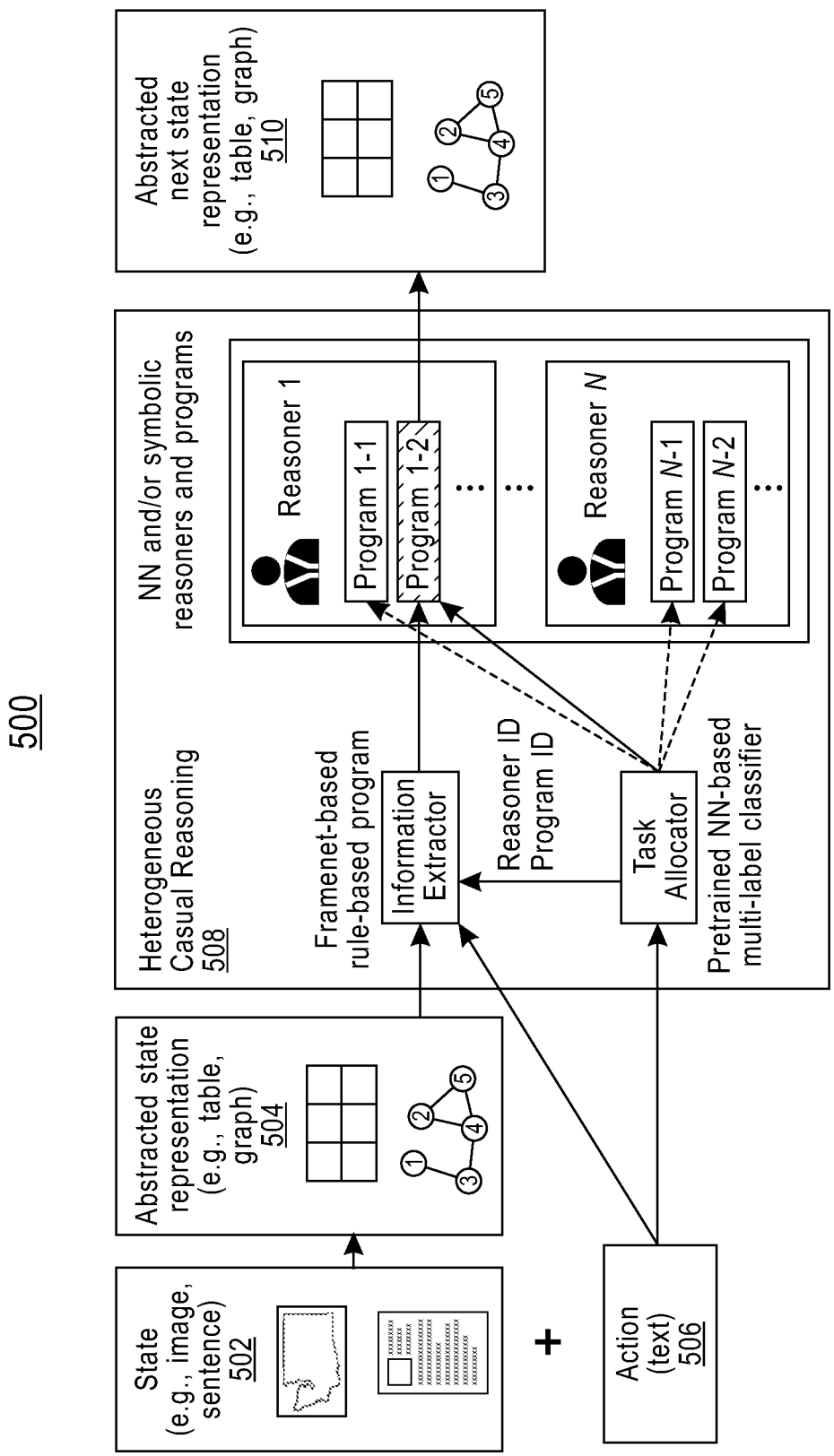
FIG. 5 is a data flow diagram, representing the data flow occurring in an embodiment of the present invention.

As shown in FIG. 5, diagram 500 is a data flow diagram which represents the flow of data according to an embodiment of the present invention. The blocks of diagram 500 will be respectively discussed in the following paragraphs.

Block 502 represents state data representing the current and/or historical states of an environment. A "state" is a set of parameter values (for example, temperature, light level, how a piece of text reads, etc.) that characterize a place or location (herein referred to as an environment). The state information may include an image or a sentence of natural language text.

Block 504 represents an abstracted state representation of the state information of block 502. The abstracted state representation may take the form of a table or a graph.

Block 506 represents an action, or, more precisely, computer code for causing an action. The action may include modifications to text.

Block 508 represents heterogeneous causal reasoning instructions and data. As shown in FIG. 5, block 508 includes an information extractor (in this example, a FrameNet based rule-based program). This is an example of computer code that effects symbolic rule based logic. In this example, the task allocator sends a reasoner identification code and a program identification code to the information extractor. Block 508 further includes a task allocator module which, in this example, takes the form of a pre-trained neural network (NN) based multi-label classifier. Block 508 further includes NN and/or symbolic reasoners and program. Because block 508 includes both symbolic reasoners and programs, as well as neural network based reasoners and programs, it is sometimes referred to herein as a "hybrid computer system." The use of a hybrid computer system potentially has various performance benefits identified throughout this document.

Block 510 represents an abstracted next state representation that is produced by the processing of the various reasoners and programs of the hybrid computer system of block 508. As explained above, this prediction of a future state can be used as a basis for determining and taking further actions.

Figure 6:
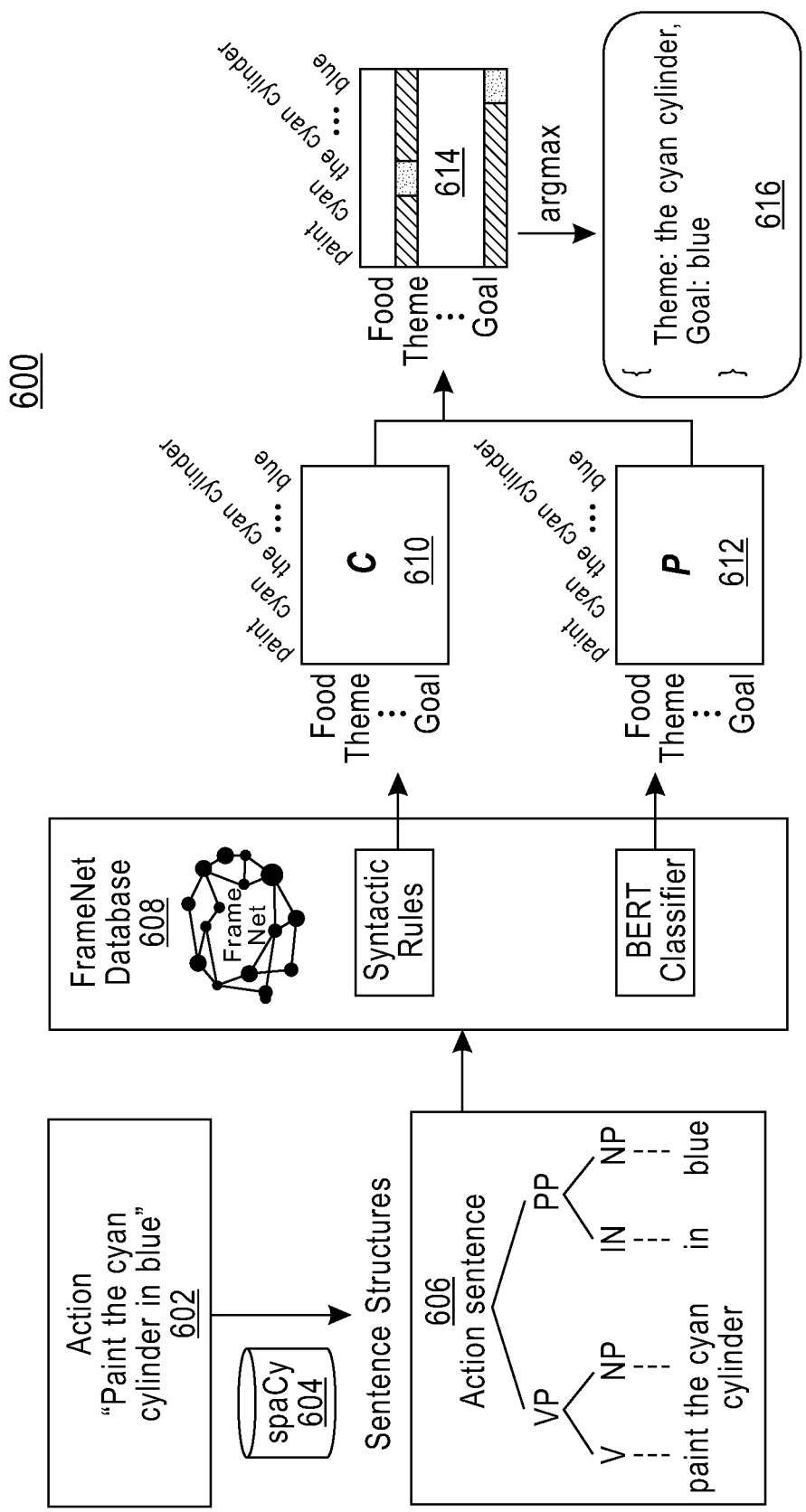
FIG. 6 is another data flow diagram, representing the data flow occurring in another embodiment of the present invention.

As shown in FIG. 6, diagram 600 is a data flow diagram which represents the flow of data according to a further embodiment of the present invention. The blocks of diagram 600 will be discussed in the following paragraphs.

Block 602 is data that represents an action. In this example, more specifically, "paint the cyan cylinder in blue." In this example, the action includes a verb (that is "paint") and an object (that is, "cylinder"). It also contains other modifiers, such as "cyan" and "blue." Block 604 represents a spaCy database that helps convert the action related data of block 602 into the sentence structure and action sequence data shown in block 606. As shown in FIG. 6, the data in block 606 has been broken down (automatically and by action of software) into different parts of speech, much in that manner of a grammar school student breaking down a sentence into parts of speech as part of her language arts curriculum.

Block 608 includes a FrameNet database, which includes: (i) a syntactic rules module that is applied to the data of block 606; and (ii) a BERT classifier module which is also applied to the data of block 606. The syntactic rules module produces the data of block 610 which includes food theme and goal. The BERT classifier module produces the data of block 612 which also includes food theme and goal.

The data of blocks 610 and 612 is merged into block 614. An argmax operation is then applied to the data of block 614 to yield the following data of block 616: (i) the theme is "the cyan cylinder"; and (ii) the goal is "blue." In this example, the further action taken based on next state prediction is the painting of the cylinder (virtual or real) with the color blue (as opposed to its original cyan color).

Figure 7:
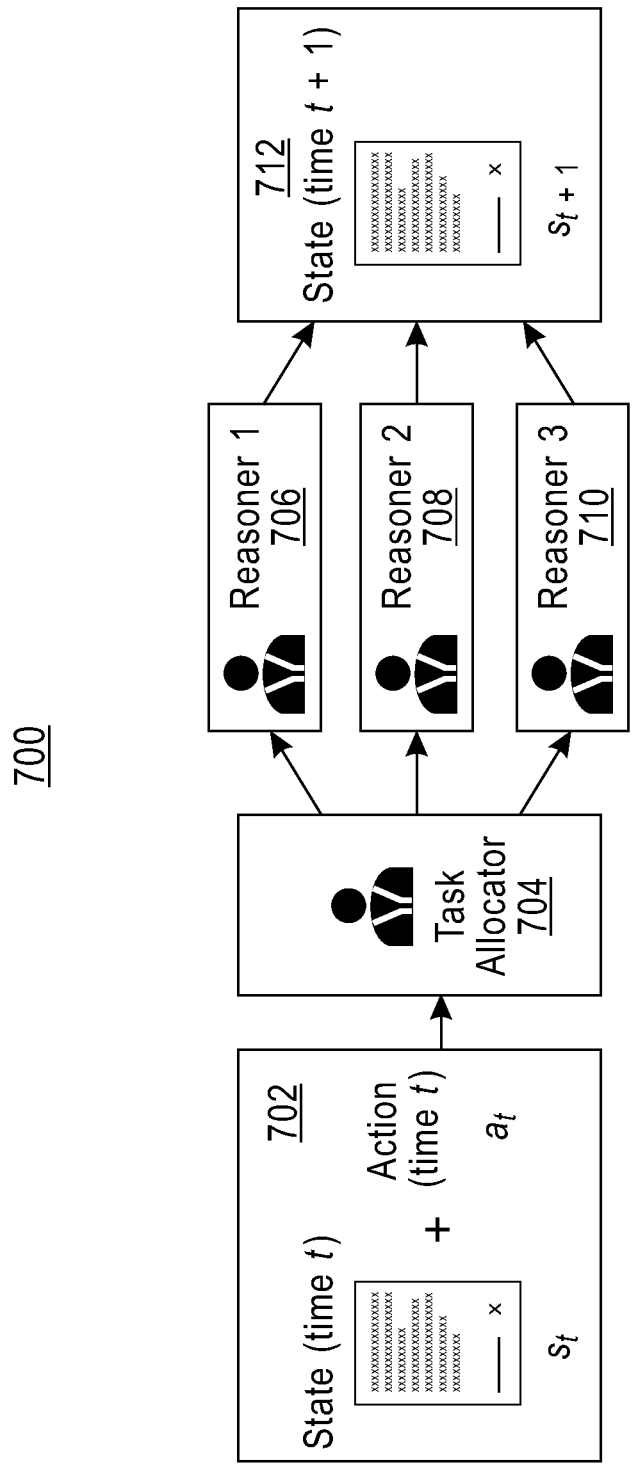
FIG. 7 is a system diagram of a second embodiment of a system according to the present invention.

As shown in FIG. 7, diagram 800 is a system diagram which represents components of an embodiment of a computer system for performing heterogeneous causal reasoning. The causal reasoning is typically the prediction of a future state of a given, monitored environment. The reasoning is characterized as being heterogenous because it employs programs and/or reasoners that include both of the following: (i) rule based symbolic logic components; and (ii) neural network components that exhibit machine learning. The blocks of diagram 800 will be discussed in the following paragraphs.

Block 802 is a state time and action time receiving module for receiving a state time and an action time as inputs to the heterogeneous causal reasoning computer system.

Block 804 is a task allocator that allocates tasks to various heterogeneous reasoners 806, 808 and 810. Block 812 is the future state prediction module that is structured and/or programmed to output a prediction of a future state of the environment based upon the reasoning of the heterogeneous set of reasoners 806, 808, 810.

In some embodiments of the present invention, a computer system for predicting a next state in an environment includes the following hardware and/or software components: (i) a task allocator which allocates a task by receiving an action in text as an input and outputting a reasoner ID and a program ID; (ii) an information extractor which extracts a required element for a reasoner from state information representing a current state, wherein the required element for the reasoner is identified by using the reasoner ID, the program ID and FrameNet; and (iii) a plurality of reasoners each having a plurality of programs, wherein a reasoner with the reasoner ID outputs a state information representing a next state by inputting the required element into a program with the program ID. In some embodiments, the task allocator has been trained as a NN-based (neural network based) multi-label classifier, the information extractor is a rule-based program module, and each reasoner having the plurality of programs is a NN and/or symbolic reasoner.

Some embodiments of the present invention may include one, or more, of the following operations, features, characteristics and/or advantages: (i) focuses on contexts and situations where actions are represented as "text"; (ii) considers heterogeneity; (iii) works in the problem where states and/or actions are represented in natural language; (iv) a framework to incorporate both commonsense reasoning and physical reasoning (for example physics equation based); (v) deals with the problem where state is represented by natural language as well as image; (vi) implements a neuro-symbolic approach, which combines both neural networks and symbolic reasoning; (vii) more specifically, some embodiments combine neural-network based classifier (Task Allocator) and symbolic reasoner/programs; and/or (viii) deals with heterogeneous reasoning on causes and associated effect by utilizing the neuro-symbolic frame.

Some embodiments of the present invention may include one, or more, of the following operations, features, characteristics and/or advantages: (i) a neuro-symbolic approach called heterogeneous neurosymbolic next state prediction (H-NS2P) for predicting the next state given the current state and action; (ii) H-NS2P incorporates multiple reasoners that are respectively developed for each specific domain; (iii) creates a dataset to train neural networks (NNs); (iv) considers problems where heterogeneous reasoning is required, which include commonsense reasoning; and/or (v) the capability of predicting what will happen is one of the factors that can make an autonomous robot behave while interacting with the environment efficiently and safely.

A naive approach for predicting the next state is to train a huge deep neural network (DNN) using a massive amount of dataset. Especially when several types of heterogeneous reasoning is required, however, it would be more difficult to collect the dataset and to train the DNN in a stable way. Even worse, commonsense reasoning in natural language domain is known to be a challenging task for deep learning models. The resulting accuracy would thus tend to be low due to the difficulty for machines to properly predict the next state.

Some embodiments of the present invention may include three modules. The first module is reasoners and programs. Each reasoner has multiple programs, and each program is neural and/or symbolic. To bridge the gap between state-action pairs and reasoners-programs, we build two additional components. The second module is a text classifier called Task Allocator (TA). TA is constructed with a deep neural network (DNN) and identifies the most appropriate reasoner-program. The third module is a State-Action Interpreter (SAI) based on FrameNet, which extracts the necessary information for the various types of specialized reasoning.

Some embodiments of the present invention may include one, or more, of the following operations, features, characteristics and/or advantages: (i) a scheme for predicting the next state while reasoning heterogeneous causality in the natural language domain; (ii) high prediction accuracy by combining: (a) an NN-based classifier with high classification accuracy, and (b) symbolic and/or NN-based reasoners; and/or (iii) creates a dataset.

Some embodiments consider a tuple T=(S, A); where S is the set of state $\{s\}$ and A is the set of action $\{a\}$. In this example, state $s \in S$ can be in various forms such as image form and sentence form, while action a is a natural language text including a verb. Let $t \in Z$ denote the discrete time step. An objective in some embodiments is to predict what the state will be at the next time step t+1 without actually executing the action $a_t$ for a state $s_t$.

Abstracted state representation will now be discussed. In the case that the information on the next state is used for making proper decisions, however, more abstracted representation would be useful. In other words, it is more preferable to obtain a summary of the next state rather than noisy images or long sentences. Some embodiments consider an abstracted state representation, $x_t \in X$, where the information on the next state is condensed. In this representation, state information is summarized in a table or graph, as follows: $x_t = \text{Abs}(s_t)$.

Some embodiments of the present invention predict $x_{t+1}$ from the given state-action pair $(x_t, a_t)$ using Algorithm (1), as follows:

Algorithm 1

H-NS²P

Input: states $\mathcal{S}$, actions $\mathcal{A}$
1: $x_t \leftarrow \text{Abs}(s_t)$
2: $c_t \leftarrow \text{TA}(a_t)$
3: $y_t \leftarrow \text{SAI}(x_t, a_t, c_t)$
4: $x_{t+1} \leftarrow \text{Reasoner-Program}(c_t, x_t, y_t)$ Line 1 of Algorithm 1 transforms an original state $s_t$ into the corresponding abstracted state $x_t$ (line 1) At line 2 of Algorithm 1, TA first identifies the most appropriate reasoner/program from the action text. At line 3 of Algorithm 1, SAI extracts the information from the state $s_t$ and action $a_t$ and creates the inputs for the program $y_t$. At line 4 of Algorithm 1, the designated program predicts the abstracted next state $x_{t+1}$ using the information extracted by the SAI.

A Task Allocator component (TA), of some embodiment of the present invention, will now be discussed. For text classification tasks, TA is obtained by fine-tuning a pre-trained transformer (for example, BERT). In this example, each label corresponds to the program ID, so that the number of labels is equal to the total number of programs, as expressed in Expression (1) as follows:

$$c = \text{TA}(a_t) \quad \text{(EXPRESSION 1)}$$

where c is the program ID. Note that the training of TA is conducted independently from the other components (for example, SAI). That is, in the inference phase, the pre-trained TA is employed. In this example, a fully-connected layer is introduced over the final hidden state h of the first token [CLS] as the representation of the whole sequence. A simple softmax classifier is added to the top of BERT to predict the probability of label c given by Expression (2) as follows:

$$p(c|h) = \text{softmax}(Wh) \quad \text{(EXPRESSION 2)}$$

where W is the task-specific parameter matrix. All the parameters are fine tuned from BERT as well as W jointly by maximizing the log-probability of the correct label.

A State-Action Interpreter component (SAI), of some embodiments of the present invention, will now be discussed. Each reasoner and program need specific information for the reasoning. For example, information is needed regarding a target object and color to guess what happens when an agent does painting. SAI provides such information $y_t$ (herein sometimes referred to as arguments) for the selected program $c_t$ by parsing $x_t$ and $a_t$ according to Expression (3) as follows:

$$y_t = \text{SAI}(x_t; a_t; c_t) \quad \text{(EXPRESSION 3)}$$

where $y_t$ is a set of key-value pairs: a name of a required argument and its value (for example, {object: metal cube, color: red}). It is assumed that a value string is contained in $a_t$. Therefore, the task for SAI can be defined as finding an appropriate portion of at for each argument required by the program $c_t$. A trivial approach for SAI is to implement extraction rules for each program; however, a number of required rules would exponentially increase along with a number of programs due to the diversity of expressions in natural language. In H-NS2P, there is an interface between state/action and program based on FrameNet that defines semantic schemes for common phenomena. By intermediating such semantic schemes between information extraction and reasoning parts, some embodiments aim to isolate the developments of each module, which makes H-NS2P easily applicable to various task settings.

FrameNet and HCR (Heterogeneous Causal Reasoning) FrameNet is a framework to interpret a particular phenomenon as a general concept. Two essential notions in FrameNet are semantic frames and frame elements. A semantic frame is a schematic description for a specific situation (for example, heat water to 70 degrees leads to apply heat frame). Frame element is made up of components required by, or related to, the situation (for example, water leads to food element, 70 degree leads to Temperature element in the Apply heat frame). Semantic frame and frame element are sometimes respectively referred to herein as "frame" and "element." The machine logic links an action in HCR to one of the frames and associates required arguments for the reasoning with the elements of the frame. By developing a program on a specific frame, it can be assumed that the frame for a given action is specified by TA, and SAI then needs to extract required elements in the frame from $a_t$. One concern is that the action will be restricted to the existing frames in FrameNet. However, FrameNet covers broader phenomena, especially for situations commonly arising in daily life. Also, FrameNet provides an annotation instruction and tool, which provides for the creation of definitions for custom frames depending on agent and environment.

In some embodiments, argument Extraction based on FrameNet. SAI leverages the public database of FrameNet. For each frame and each element, the database contains syntactic patterns consisted of phrase structure (for example, NP (Noun phrase) and dependency relation (for example, object. Also, each frame has example sentences with character span annotations about elements (e.g., {begin=5, end=10, element=Food} for heat water to 70 degree). Incorporating these two annotations, some embodiments involve a pipeline extraction method: (i) extracts candidate elements with syntactic rules for each phrase, (ii) estimates a likelihood of each candidate element with a neural classifier, and (iii) assigns a probable phrase to each required element (that is, argument) based on (i) and (ii) while satisfying hard constraints defined in FrameNet. A phrase may be represented with d and an element may be represented with e. Also, a set of possible elements is denoted as $E=\{e_0, e_1, \ldots, e_M\}$, and a set of required elements by the program $c_t$ is $\hat{E}=\{\hat{e}0, \hat{e}1, \ldots, \hat{e}_M\}$ where $\hat{E} \subseteq E$.

In the rule matching part, SAI first obtains N pieces of phrases $d=\{d_0, d_1, \ldots d_N\}$ and the syntactic tree by parsing the sentence at with the phrase-structure parser in spaCy. Then, SAI compares all the syntactic patterns with each phrase and creates a count matrix $C \in N^{M*N}$ where $C_{m,n}$ represents a number of matched patterns that are related to $e_m$ in terms of the n-th phrase. Cm;n has 0 when the frame possesses no patterns regarding the m-th element, or no patterns matched with the n-th phrase.

Next, in the statistical estimation part, SAI calculates scores of elements $e_m$ for each phrase $d_n$ by combining the count matrix C and probabilities computed by a neural classifier. The input of the classifier is a k-dimensional vector $v_n \in R^k$ for $d_n$. The classifier computes a probability of an element according to Expression (4) as follows:

$$p(e_m|d_n) = \text{softmax}_m(\hat{W}vn) \quad \text{(EXPRESSION 4)}$$

where $\hat{W}$ is a parameter matrix trained with the character span annotations in the FrameNet database. From this may be derived a probability matrix, and, finally, some embodiments of the present invention compute a score matrix.

It is noted that a frame has a list of representative verbs for a frame (sometimes referred to as a "Lexical Unit"), and also syntactic patterns are defined for each verb. Although only using a set of patterns for the verb in at is straightforward, some action may contain a verb that does not exist in the list. To cope with the issue, some embodiments may ignore verb matching and apply the all patterns of all verbs in the frame. some embodiments take the sum of vectors from an beginning token to an end token of a phrase.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) performed by a hybrid computing system comprising a neural network that includes machine learning functionality and a symbolic rule based software module that includes a symbolic reasoner, wherein the CIM comprises steps of:
   receiving a current state information set including a plurality of attribute values characterizing a current and historical status of an environment with the plurality of attribute values including at least a temperature attribute value characterizing a temperature value in the environment;
   receiving first action information including information indicative of a first action being taken in the environment;
   applying the neural network of the hybrid computing system to the current state information data set and the first action information that includes the information indicative of the first action being taken in the environment to make a first prediction of a future temperature value in the environment, with the neural network including a pre-trained multi-label classifier;
   applying the symbolic reasoner of the hybrid computing system to the current state information data set to make a second prediction of the future temperature value in the environment, with the symbolic reasoner including a plurality of software based rules, with the application of the symbolic reasoner including applying each rule of the plurality of software based rules to a symbolic representation of the current state information; and
   making a third prediction of the future temperature value based on the first prediction and the second prediction.

2. A computer-implemented method (CIM) performed by a hybrid computing system comprising a neural network that includes machine learning functionality and a symbolic rule based software module that includes a symbolic reasoner, wherein the CIM comprises steps of:
   receiving a current state information set including a plurality of attribute values characterizing a current and historical status of an environment with the plurality of attribute values including at least a light and/or color attribute value characterizing a light and/or color related value in the environment;
   receiving first action information including information indicative of a first action being taken in the environment;
   applying the neural network of the hybrid computing system to the current state information data set and the first action information that includes the information indicative of the first action being taken in the environment to make a first prediction of a future light and/or color value in the environment, with the neural network including a pre-trained multi-label classifier;
   applying the symbolic reasoner of the hybrid computing system to the current state information data set to make a second prediction of the future light and/or color value in the environment, with the symbolic reasoner including a plurality of software based rules, with the application of the symbolic reasoner including applying each rule of the plurality of software based rules to a symbolic representation of the current state information; and
   making a third prediction of the future light and/or color value based on the first prediction and the second prediction.

3. A computer-implemented method (CIM) performed by a hybrid computing system comprising a neural network that includes machine learning functionality and a symbolic rule based software module that includes a symbolic reasoner, wherein the CIM comprises steps of:
   receiving a current state information set including a plurality of attribute values characterizing a current and historical status of text document;
   receiving first action information including information indicative of a first action being taken on the text document;
   applying the neural network of the hybrid computing system to the current state information data set and the first action information that includes the information indicative of the first action being taken in the environment to make a first prediction of a future word and/or phrase that will be added to the text document, with the neural network including a pre-trained multi-label classifier;
   applying the symbolic reasoner of the hybrid computing system to the current state information data set to make a second prediction of the future word and/or phrase that will be added to the text document, with the symbolic reasoner including a plurality of software based rules, with the application of the symbolic reasoner including applying each rule of the plurality of software based rules to a symbolic representation of the current state information; and making a third prediction of the future word and/or phrase that will be added to the text document based on the first prediction and the second prediction.

4. The computer-implemented method of claim 1, wherein the current state information further comprises an image.

5. The computer-implemented method of claim 2, wherein the current state information further comprises an image.

6. The computer-implemented method of claim 3, wherein the current state information further comprises an image.

7. The computer-implemented method of claim 1, wherein the symbolic rule based software module is void of any machine learning component.

8. The computer-implemented method of claim 2, wherein the symbolic rule based software module is void of any machine learning component.

9. The computer-implemented method of claim 3, wherein the symbolic rule based software module is void of any machine learning component.

* * * * *